United States Patent

[11] 3,568,824

| [72] | Inventor | George M. Tarzian |
| | | 1744 Rosehill Drive, Chicago, Ill. 60626 |
| [21] | Appl. No. | 743,551 |
| [22] | Filed | July 9, 1968 |
| [45] | Patented | Mar. 9, 1971 |

[54] VIBRATOR WORK PARTS FEEDER AND RESERVOIR SUPPLY SYSTEM
7 Claims, 2 Drawing Figs.

[52] U.S. Cl. ................................. 198/220
[51] Int. Cl. ................................. B65g 27/02
[50] Field of Search......................... 198/220;
222/196, 199; 312/71

[56] References Cited
UNITED STATES PATENTS

| 831,489 | 9/1906 | Thomas.................. | 312/71X |
| 1,967,229 | 7/1934 | Drevitson............... | 17/2 |
| 2,369,660 | 2/1945 | Carr....................... | 209/73 |
| 2,760,679 | 8/1956 | Chadderton et al..... | 198/33.1X |
| 2,790,534 | 4/1957 | Spurlin................... | 198/220X |
| 3,011,625 | 12/1961 | Bailey et al............. | 198/220 |
| 3,048,260 | 8/1962 | Willis..................... | 198/220 |
| 3,099,359 | 7/1963 | Taylor.................... | 198/220X |
| 3,125,208 | 3/1964 | Secunda.................. | 198/220X |
| 3,200,941 | 8/1965 | Heyer..................... | 198/220 |
| 3,263,806 | 8/1966 | Ring....................... | 312/71X |
| 3,502,201 | 3/1970 | Spiess et al............. | 198/220 |

FOREIGN PATENTS

| 699,364 | 11/1953 | Great Britain............ | 198/220 |

*Primary Examiner*—Evon C. Blunk
*Assistant Examiner*—W. Scott Carson
*Attorney*—Farley, Forster and Farley

ABSTRACT: A vibratory work parts feeder including an annular rim mounted for vibrational actuation and having a spiral ascending track on its inner periphery, a deep reservoir bowl for work parts disposed in concentric relation therewithin and extending relatively below said rim, and means within the reservoir bowl for elevating and maintaining work parts at the level of said rim for distribution thereto and subsequent transfer thereby.

PATENTED MAR 9 1971

3,568,824

INVENTOR.
GEORGE M. TARZIAN
BY
Juley, Foster & Furley

ATTORNEYS

VIBRATOR WORK PARTS FEEDER AND RESERVOIR SUPPLY SYSTEM

BACKGROUND OF THE INVENTION

Vibratory parts feeders commonly used to feed work parts to a work station employ a feeder bowl, with an ascending spiral track on its inner peripheral wall. The bowl is usually made relatively deep to stock a reasonable supply of parts or is used in combination with a separate overhead feeder hopper having a control system to meter parts to the bowl.

A conventional deep feeder bowl carries an ever changing work load as parts are used up and consequently has variations in its vibratory spring rate which in turn affects its feed rate, a stronger vibrator being needed when the deep bowl is full than when it is nearly empty, because of the weight differential, for consistent feed rates.

In contrast, an overhead feed hopper requires overhead space for gravity feed, adds servicing problems, particularly with very heavy parts, and involves the added expense and problems of special metering controls.

SUMMARY OF THE INVENTION

The present invention relates to vibratory work parts feeders and in particular to a work part reservoir and feed system for use therewith having all of the advantages of both deep bowl and separate overhead feed hopper systems without the attending problems and expensive thereof.

A vibratory feeder with a shallow annular feeder rim is mounted on an open center housing and within the housing is provided a separate deep feeder bowl or reservoir with an elevating means for raising work parts, as used, to the level of the feeder rim. The deep bowl reservoir need not be part of the feeder rim, which is vibrated, and which includes the conventional spiral feed track, and consequently its weight and variable parts load need not be imposed on the vibratory system. However, the reservoir bowl is formed to complement and fit within the center opening in the feeder rim, so that it simulates a conventional deep feeder bowl, and the elevating means in the reservoir serves as a movable floor or false bottom which keeps the work parts at a proper level to feed into the vibrating feeder rim.

With some loss of efficiency the reservoir bowl may serve as the housing and base support for the vibratory feeder rim and be an integral part of the work part feeder or it may be received separately in a rim supporting housing.

The work part elevating means in the reservoir bowl may be spring balanced and responsive to the work part load or operated by an electric motor, air or hydraulic fluid cylinder.

The general concept is one of retaining a reserve supply of work parts within the general space limitations for a vibratory feeder, pushing up the work parts to a feed level, and distributing them circumferentially and uniformly to a vibrationally responsive annular member for ascending spiral track feed in the conventional manner of vibratory parts feeders.

DETAILED DESCRIPTION OF THE INVENTION

Figure 1:
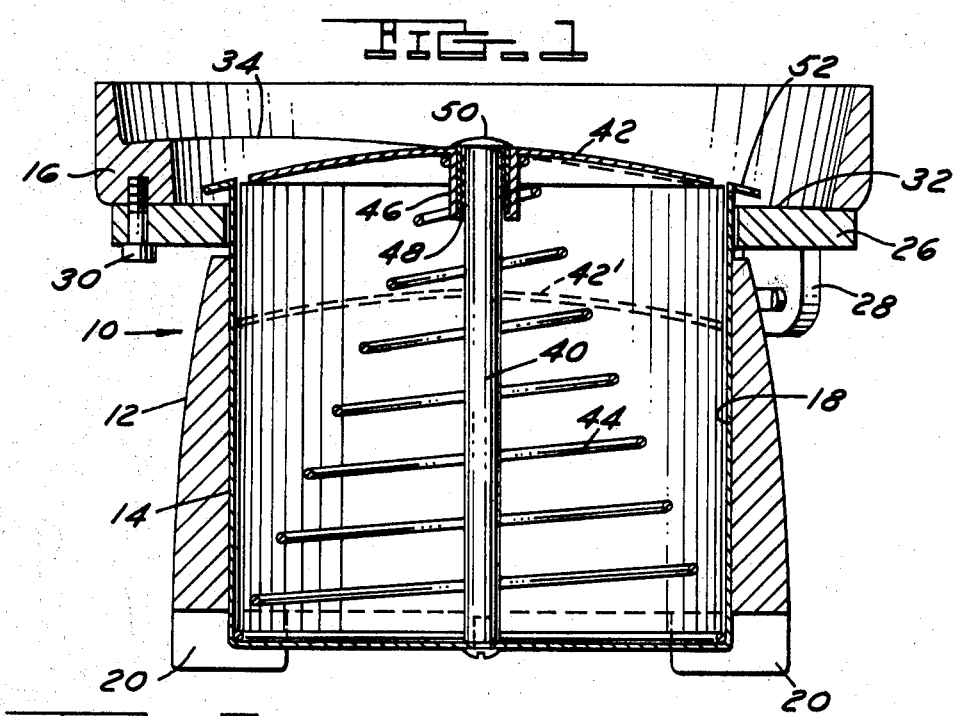
FIG. 1 is a cross-sectional side elevational view of the vibratory feeder and reservoir feed system of this invention, as seen in the plane of line 1-1 in the next succeeding drawing FIG.
Figure 2:
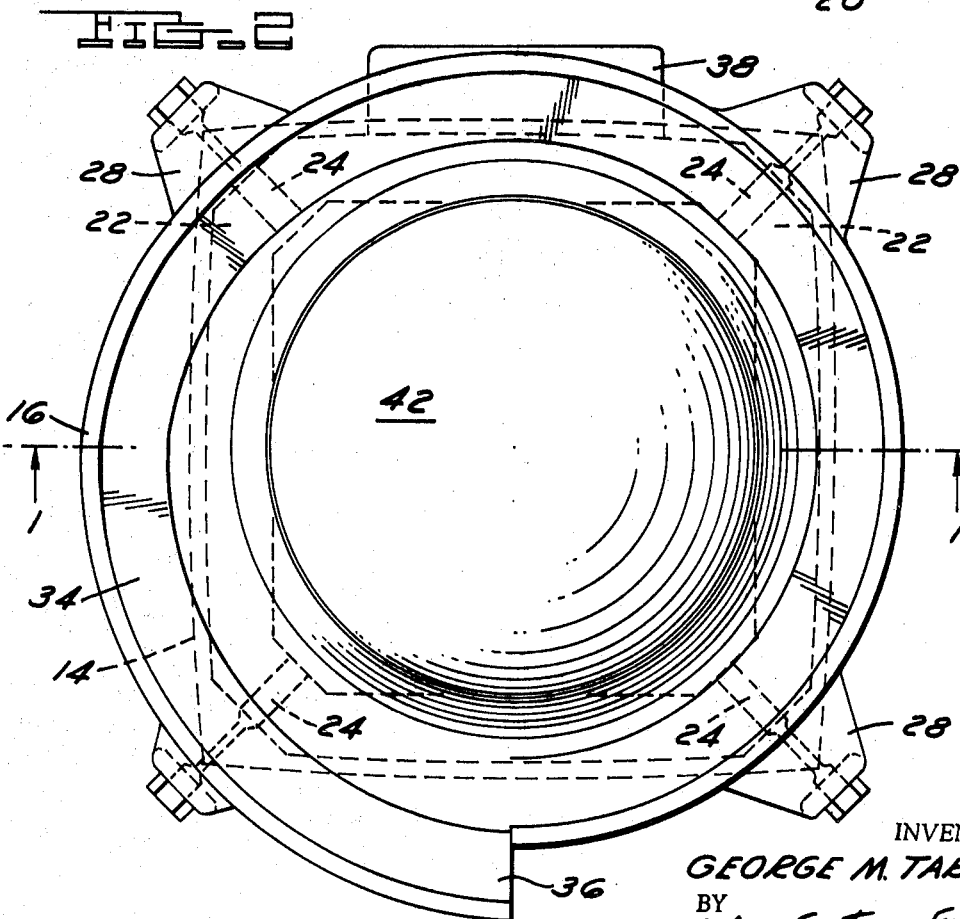
FIG. 2 is a slightly enlarged top plan view of the vibratory feeder shown in the first drawing FIG.

The work parts feeder 10 shown in the drawings includes a support housing 12 within which is disposed a reservoir bow 14 and on which is mounted the vibratory feeder rim 16.

The support housing 12 is relatively square in shape with a center opening 18 sized to receive and hold the reservoir bowl 14 therewithin, as a liner, and, in the present instance, as an integral part thereof. It includes foot pads 20 at each lower corner and is provided with mounting pads 22 at its upper corners for the torsion spring support elements 24 that extend radially outward and carry the feeder rim 16.

An annular ring 26, with outwardly extending and depending lugs 28, is carried by the spring supports 24 and it has the feeder rim 16 mounted on it, as by bolt fasteners 30, shown in FIG. 1, to provide the bottom wall for a relatively shallow feeder track portion on the support housing and one which is disposed circumferentially about the reservoir bowl 14. A convex curvature 32 is provided on the upper surface of the ring 26 and the rim 16 is formed to include an ascending helical track 34, as is conventionally known, for work parts to be carried up and out of the feeder bowl to the open discharge end 36 of the opening spiral track.

The annular feeder track portion provided by ring 26 and rim 16 is caused to vibrate by a vibratory motor 38 carried by the support housing 12 and operatively engaged with the feeder parts, in a manner generally known and requiring no detailed description. Similarly, it should suffice to note that the torsion spring support elements 24 are of the type disclosed in my copending patent application, Ser. No. 696,407, filed Jan. 8, 1968, now U.S. Pat. No. 3,500,993, and entitled VIBRATORY WORK FEEDER DEVICE.

Referring now to the reservoir bowl 14, it will be noted that a center support post 40 is provided and that an elevating circular convex plate 42 serves as a movable floor or false bottom for the reservoir and is carried on the support post and is biased by a helical cone spring 44 to an upper disposition where it complements the bottom of the shallow feeder portion carried on the support housing. The lift plate 42 is formed to include a collar 46 about the post 40 and has a bearing 48 therewithin to assure horizontal disposition and relatively free spring biased travel of the plate on the center support. The base of spring 44 is dimensioned and formed to seat in the bottom of the reservoir bowl while the upper end fits about the collar 46 and under the lift plate.

The head 50 on the center support post 40 limits upper travel of the movable floor plate 42 and, under a load of work parts, the spring 44 is compressed so that the level of the lift plate may be as shown by the dotted outline 42' and the upper level of work parts, in the reservoir bowl and supported on the lift plate, will be such as causes a radial distribution of work parts into the shallow annular track portion and for vibratory feed therefrom.

Although the upper open end of the reservoir bowl 14 is shown to include an annular lip or flange 52 extending out over the annular ring 26 that forms the bottom of the feeder bowl, it will be appreciated that the reservoir bowl is not carried by the ring and that the ring is relatively, though closely, spaced apart therefrom. The feeder track portion does not carry the weight of the reservoir bowl or of the work parts carried in the bowl. Moreover, as a consequence of the freedom from this work load, a lesser vibratory force may be operative and the relatively consistent parts load in the feeder track portion assures a more uniform spring rate and performance of the vibratory feed system.

The reservoir bowl 14 may be square, rather than round, in which case the lift plate 42 would be formed as a flat pyramid with an apex point. The reservoir bowl 14 may be also of more substantial construction than shown and serve, in itself, as the support housing on which the bowl forming ring 26 and annular rim 16 are mounted, along with the vibratory motor 38. In such instances, and where space permits, the vibratory feeder of the present invention may be freestanding and extend up from floor level near the equipment it is intended to serve.

The vibratory feeder of the present invention may be adapted for feeding any of a number of different work parts, of different sizes and weight, by changing the rim 16 to provide the necessary size and rise for the feeder track 34 and by modifying the means for elevating the movable floor as necessary to accommodate any difference in the volumetric weight of the work part load to maintain the desired feed level from the reservoir bowl to the feeder rim. It will also be appreciated that other actuating means than the counter balancing spring 44 may be used to raise the lift plate 42; as for example an electric motor, with level switches, or air or hydraulic cylinder means under suitable leveling controls.

The reservoir system proposed for vibratory work parts feeders, with the load leveling features, and located centrally within a feeder bowl, without inhibiting the vibratory actuation thereof, provides a relatively simple and inexpensive means of supplying work parts to a feeder. Whether the reservoir and feeder are integrally constructed, with the reservoir being part of the feeder bowl supporting structure, or a separate load sensitive reservoir bowl is adapted for use with a vibratory feeder, the advantages and modifications conceivable are numerous.

I claim:

1. An improved vibratory work parts feeder, comprising:
   an annular member mounted for vibratory response and having an ascending spiral track provided on its inner peripheral wall;
   means for vibrating said annular member;
   reservoir for work parts supported separately from and disposed concentrically within said annular member,
   movable floor within said reservoir; and
   means to automatically elevate said floor to feed work parts to the annular member and to maintain work parts at a predetermined level in the bottom of said annular member in response to the demand of the vibratory feeder being supplied.

2. The vibratory feeder of claim 1, said reservoir extending relatively below said annular member and having an open upper end at substantially the lower level of the ascending spiral track therewithin.

3. The vibratory feeder of claim 1, wherein said means to automatically elevate said floor includes load responsive and counter balancing spring means operative thereof.

4. The vibratory feeder of claim 2, including:
   a support housing having said reservoir disposed therein and said annular member mounted thereon for vibrational actuation independently thereon;
   said means to elevate said floor having load responsive and counter balancing spring means provided under said floor and operative thereof; and
   said floor being formed to include a convex upper surface for the radial distribution of work parts outwardly towards said annular member at the level of distribution thereto.

5. The vibratory feeder of claim 1, wherein said automatic means includes means to maintain said work parts on said floor at a level for gravitational discharge to said annular member.

6. The vibratory feeder of claim 5, wherein said movable floor is upwardly convex.

7. The vibratory feeder of claim 6, wherein said automatic means is responsive to the weight of work parts remaining on said floor.